United States Patent
Gandhi et al.

(10) Patent No.: US 7,991,421 B2
(45) Date of Patent: Aug. 2, 2011

(54) METHOD OF DYNAMIC OVERHEAD CHANNEL POWER ALLOCATION

(75) Inventors: Asif Dawoodi Gandhi, Iselin, NJ (US); Joseph Montalto, Clifton, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 828 days.

(21) Appl. No.: 11/970,151

(22) Filed: Jan. 7, 2008

(65) Prior Publication Data
US 2009/0176530 A1 Jul. 9, 2009

(51) Int. Cl.
*H04B 7/00* (2006.01)
*H04M 1/00* (2006.01)

(52) U.S. Cl. .................. 455/522; 455/561
(58) Field of Classification Search .............. 455/522, 455/561
See application file for complete search history.

(56) References Cited

U.S. PATENT DOCUMENTS

| | | | |
|---|---|---|---|
| 2002/0141505 A1* | 10/2002 | Lundby | 375/261 |
| 2005/0176419 A1* | 8/2005 | Triolo et al. | 455/423 |
| 2005/0201331 A1* | 9/2005 | Gaal et al. | 370/332 |
| 2006/0116154 A1 | 6/2006 | Han | 455/522 |
| 2007/0140160 A1 | 6/2007 | Lee et al. | 370/329 |
| 2007/0184871 A1 | 8/2007 | Morita | 455/522 |

FOREIGN PATENT DOCUMENTS
EP 1047206 A1 4/1999

OTHER PUBLICATIONS

International PCT Search Report PCT/US2009/000061 dated Aug. 6, 2009.
Written Opinion based on International PCT Search Report PCT/US2009/000061 dated Aug. 6, 2009.

* cited by examiner

*Primary Examiner* — Marivelisse Santiago-Cordero
*Assistant Examiner* — Omoniyi A Obayanju
(74) *Attorney, Agent, or Firm* — Williams, Morgan & Amerson, PC

(57) ABSTRACT

The present invention provides a method for implementation in a base station that supports at least one downlink traffic channel and at least one overhead channel. The method includes determining power allocation(s) for overhead channel(s) based upon a measurement of downlink traffic channel power and a maximum transmission power of the base station. The method also includes transmitting signals over the overhead channel(s) using the power allocation concurrently with transmission of signals over the downlink traffic channel.

11 Claims, 8 Drawing Sheets

METHOD OF DYNAMIC OVERHEAD CHANNEL POWER ALLOCATION

BACKGROUND OF THE INVENTION

1. Field of the Invention

This invention relates generally to communication systems, and, more particularly, to wireless communication systems.

2. Description of the Related Art

Conventional wireless communication systems include a network of base stations, base station routers, and/or other wireless access points that are used to provide wireless connectivity to mobile units in geographic areas (or cells) associated with the network. Information may be communicated between the network and the mobile units over the air interface using wireless communication links that typically include multiple channels. The channels include forward link (or downlink) channels that carry signals from the base stations to the mobile units and reverse link (or uplink) channels that carry signals from the mobile units to the base station. The channels may be defined using a time slots, frequencies, scrambling codes or sequences, or any combination thereof. For example, the channels in a Code Division Multiple Access (CDMA) system are defined by modulating signals transmitted on the channels using orthogonal codes or sequences. For another example, the channels in an Orthogonal Frequency Division Multiplexing (OFDM) system are defined using a set of orthogonal frequencies known as tones or subcarriers.

A typical wireless communication link between a base station and the mobile unit includes one or more traffic channels for carrying voice and/or data and one or more overhead channels that include channels for transmitting pilot signals, paging signals, synchronization signals, and the like. The pilot channel carries a pilot signal that is used as the reference against which the mobile unit demodulates all the channels including the traffic channels. The paging channel is used to signal the mobile unit in the event of an incoming call and to respond to calls initiated by the mobile unit. The synchronization channel is used to ensure that the mobile unit is properly time-synchronized with the network. In systems such as the IS-95/3G1X systems, the pilot, paging, and the synchronization channels are broadcast from every sector-carrier (e.g., a base station or a sector served by a base station) to facilitate system acquisition, call setup, and traffic channel transmission. Erroneous reception of any of these channels degrades system coverage and performance.

The forward link coverage of the network depends upon the ability of mobile units to properly demodulate the signaling channels and traffic channels transmitted by base stations in the network. The signal-to-interference-plus-noise ratio (SINR) associated with signals received at the mobile units over each of these channels determines, at least in part, whether the mobile unit will be able to successfully demodulate signals received over these channels. The SINR is a function of the power of the desired signal at the mobile unit (i.e., the signal component) and the sum of the interference power present at the mobile unit and the mobile thermal noise power (i.e., the interference-plus-noise component). In CDMA systems, the interference component in a given frequency band is primarily formed by signals generated by other sectors in the network on the same frequency band. The noise is predominantly thermal noise. Other factors being equal, higher SINRs result in a higher probability of successful demodulation of signals received by the mobile units.

Dedicating more power to the overhead channels in the network increases the SINR for the overhead channels, which may increase the probability of proper reception of the overhead channels that the mobile unit. However, in CDMA systems, increasing the overhead channel power eventually results in marginal gains in coverage/performance because CDMA is limited by its own inter-cell interference. The theoretical point at which an increase in overhead channel power would not result in any improvement in coverage or performance is called the interference limit. As long as the interference limit has not been reached, increasing overhead channel power throughout the network should result in some improvement in network coverage and/or performance. The available sector-carrier power in a CDMA system is shared between the overhead channels and the traffic channels. Consequently, there is a trade-off between overhead channel power and available traffic capacity which results in the potential traffic capacity decreasing as the overhead power increases. The overhead channel power is therefore typically selected to achieve reasonable coverage at full capacity load. Typical settings for the overhead channels allocate 15% of the total available power to pilot signals, 1.5% to synchronization signals, and 5.5% to the paging channels.

FIG. 1 schematically represents a conventional fixed overhead channel power allocation scheme 100. The pilot signal power 105, the paging channel power 110, and the synchronization signal 115 are set to a fixed power percentage with respect to the maximum available cell power 120. The power 125 consumed by the traffic channels varies according to the current traffic load and per-user power requirements, while the overhead channel powers 105, 110, 115 remain fixed. The conventional fixed overhead channel power allocation scheme often allows available cell power to go unused. The unused power in FIG. 1 is the difference between the maximum available power 120 and the total of the overhead and traffic powers 105, 110, 115, 125. Leaving the overhead channel power fixed therefore means that power that could have been used to improve coverage and/or performance goes unused. The wireless communication system therefore does not achieve its optimal levels of coverage and/or performance.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for implementation in a base station that supports at least one downlink traffic channel and at least one overhead channel. The method includes determining power allocation(s) for overhead channel(s) based upon a measurement of downlink traffic channel power and a maximum transmission power of the base station. The method also includes transmitting signals over the overhead channel(s) using the power allocation concurrently with transmission of signals over the downlink traffic channel.

BRIEF DESCRIPTION OF THE DRAWINGS

The invention may be understood by reference to the following description taken in conjunction with the accompanying drawings, in which like reference numerals identify like elements, and in which.

Figure 1:
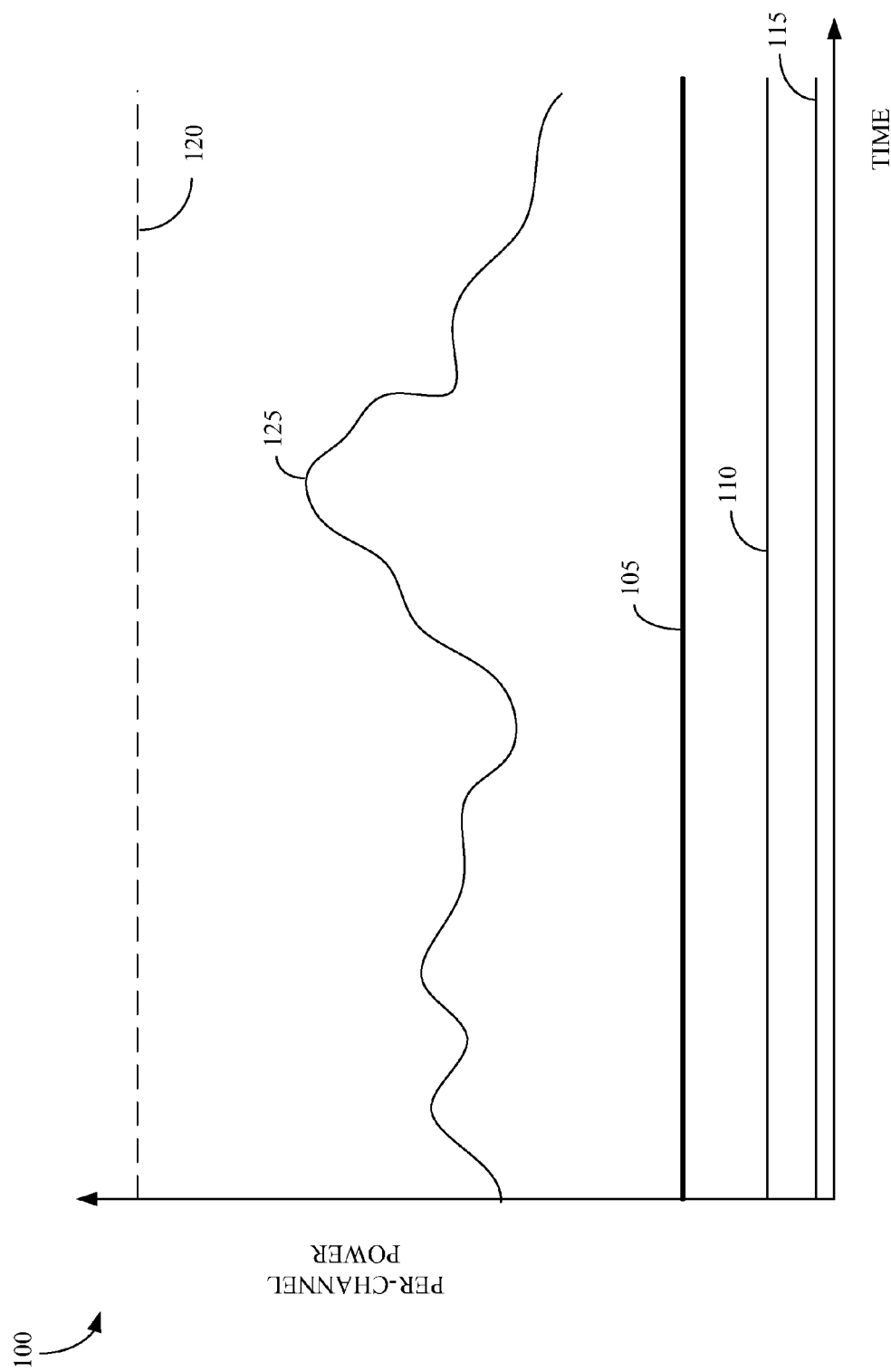
FIG. 1 schematically represents a conventional fixed overhead channel power allocation scheme.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 2:
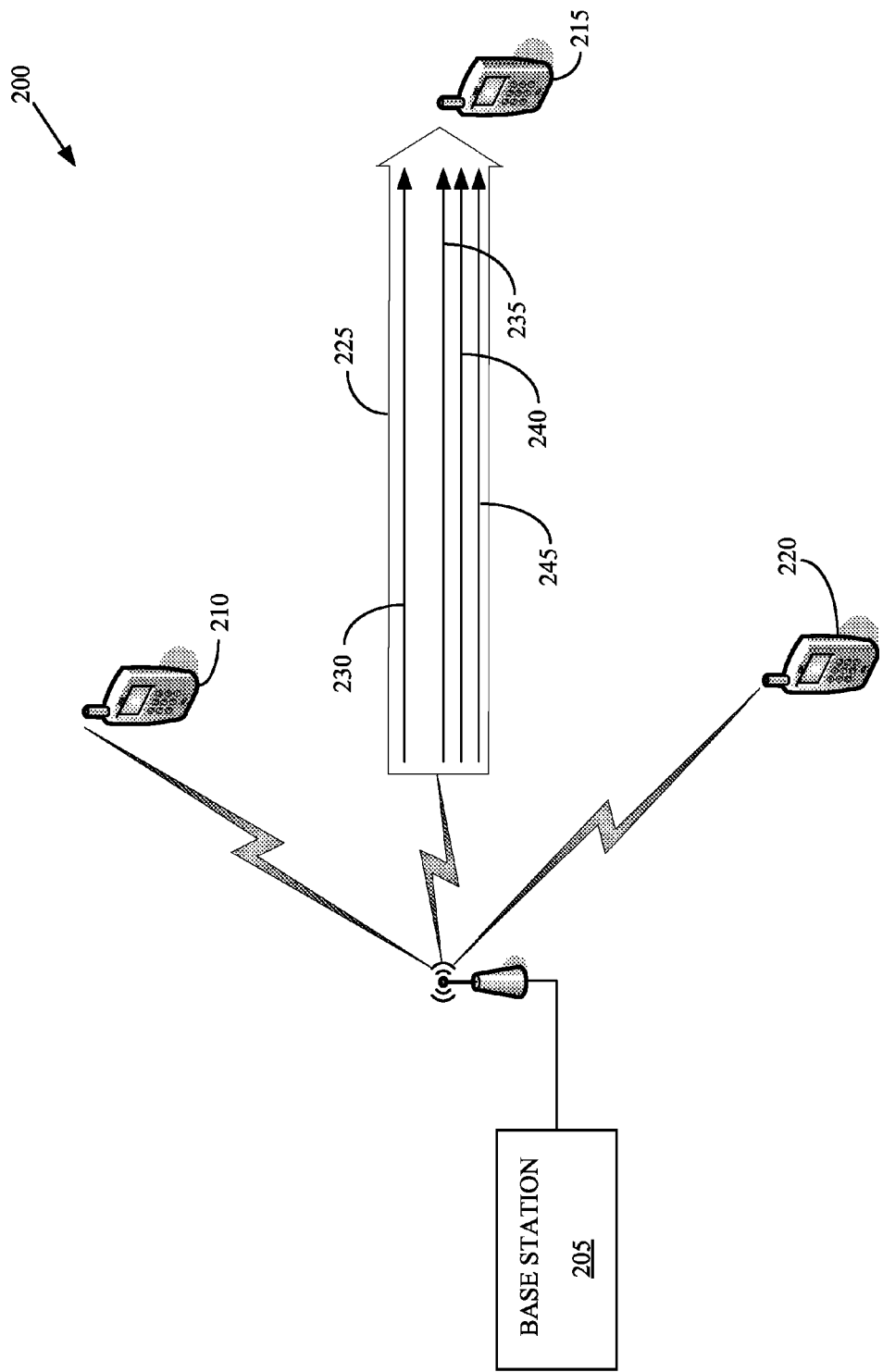
FIG. 2 conceptually illustrates a first exemplary embodiment of a wireless communication system, in accordance with the present invention.

FIG. 2 conceptually illustrates a first exemplary embodiment of a wireless communication system 200. In the illustrated embodiment, the wireless communication system 200 includes a base station 205 for providing wireless connectivity to one or more mobile units 210, 215, 220. In the interest of clarity, only one base station 205 is shown in FIG. 2. However, persons of ordinary skill in the art having benefit of the present disclosure should appreciate that alternative embodiments of the wireless communication system 200 may include any number of base stations 205. Moreover, wireless connectivity to the wireless communication system 200 may alternatively be provided by other devices such as base station routers, access points, access networks, and the like. In the illustrated embodiment, the base station 205 and the mobile units 210, 215, 220 operate according to Code Division Multiple Access (CDMA) standards and/or protocols. However, in alternative embodiments, the base station 205 and the mobile units 210, 215, 220 may operate according to other standards and/or protocols for defining channels within the wireless communication system 200, such as Orthogonal Frequency Division Multiplexing (OFDM). Furthermore, the techniques described herein may also be implemented in wireless communication systems 200 that operate according to other standards, such as R99 UMTS and the like.

The wireless communication link between the base station 205 and the mobile unit 215 supports a downlink or forward link 225. The forward link 225 supports various channels including one or more traffic channels 230 and overhead channels including pilot channels 235, paging channels 240, and synchronization channels 245. The pilot channel 235 carries a pilot signal that is used as the reference against which the mobile unit 215 can demodulate channels including the traffic channels 230. The paging channel 240 is used to signal the mobile unit 215 in the event of an incoming call and to respond to calls initiated by the mobile unit 215. The synchronization channel 245 is used to ensure that the mobile unit 215 is properly time-synchronized with the network 200 and/or the base station 205. In the illustrated embodiment, the channels 230, 235, 240, 245 are defined by modulating a signal using orthogonal code sequences defined in accordance with CDMA standards and/or protocols. However, in alternative embodiments, other techniques for defining orthogonal channels 230, 235, 240, 245 may be implemented so that information may be transmitted concurrently over the channels 230, 235, 240, 245. For example, the channels 230, 235, 240, 245 may be defined using orthogonal frequencies, tones, and/or subcarriers, e.g., according to OFDM standards and/or protocols.

In operation, the base station 205 may initially allocate a certain portion of the total power budget of the base station 205 for transmission over the traffic channels 230 and the overhead channels 235, 240, 245. For example, power may be allocated to the traffic channels 230 based upon the amount of information scheduled for transmission to the mobile unit 215, the data rate used to transmit the information, a desired bit error rate, channel conditions, and/or any other criteria. Accordingly, the power used to transmit information over the traffic channels 230 may vary over time. The base station 205 may also initially allocate a fixed portion of the total power budget to the overhead channels 235, 240, 245. For example, the base station 205 may initially allocate 15% of the total available power to the pilot channel 235, 1.5% to the synchronization channel 245, and 5.5% to the paging channel 240. The initial overhead channel power allocations may then be dynamically varied so that approximately all the total power budget of the base station 205, or some selected fraction of the total power budget, is used for transmission over the traffic channels 230 and the overhead channels 235, 240, 245.

Figure 3:
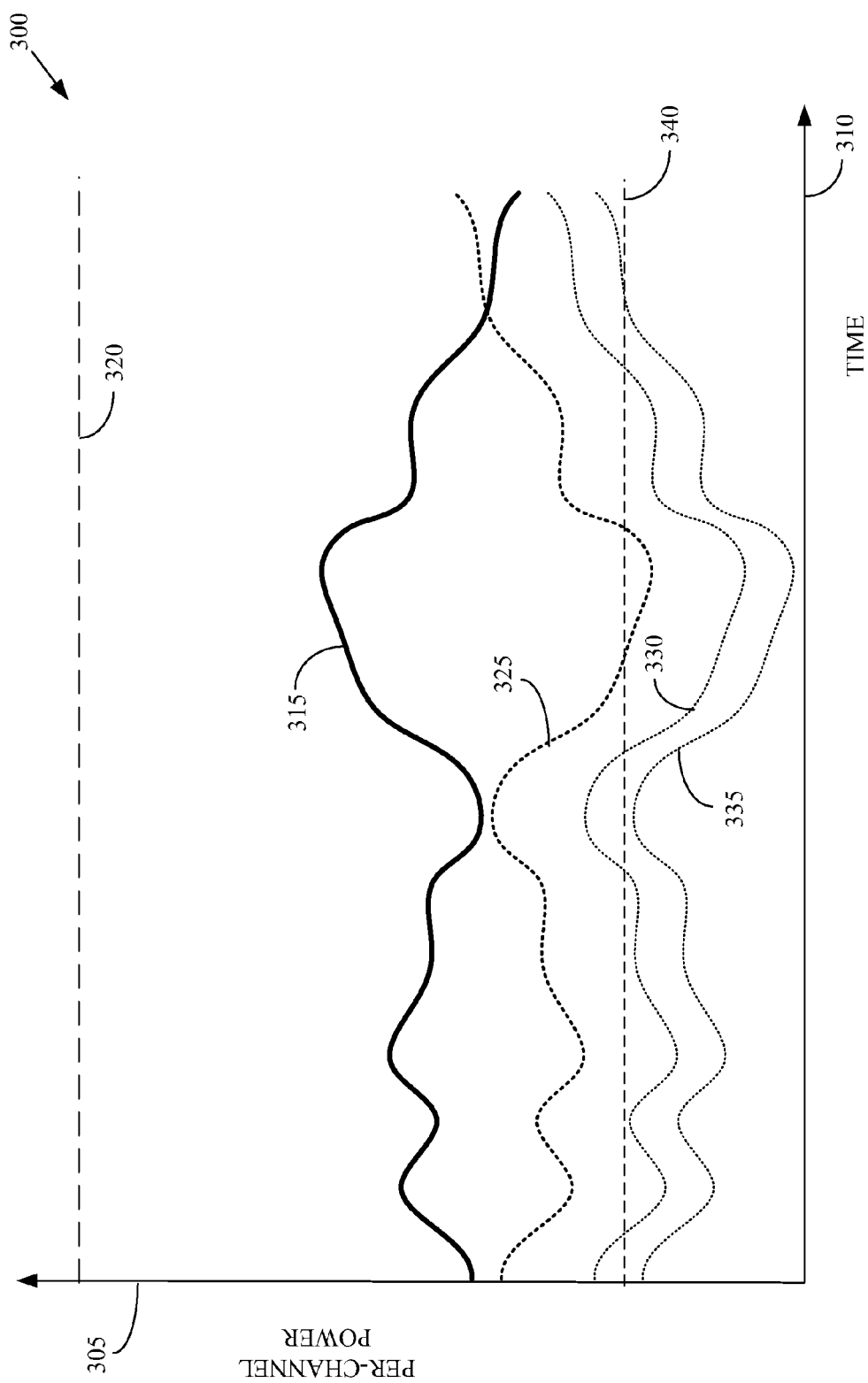
FIG. 3 conceptually illustrates a first exemplary embodiment of a dynamic overhead channel power allocation scheme, in accordance with the present invention.

FIG. 3 conceptually illustrates a first exemplary embodiment of a dynamic overhead channel power allocation scheme 300. The vertical axis 305 in FIG. 3 indicates the power allocated to each channel in arbitrary units and the horizontal axis 310 indicates increasing time in arbitrary units. The traffic channel power allocation 315 can be measured or estimated at the base station. Persons of ordinary skill in the art should appreciate that many techniques for measuring and/or estimating the traffic channel power allocation 315 are known in the art. The dynamic overhead channel power allocation scheme 300 uses measurements of the traffic channel power allocation 315 and the total power budget of the base station 320 to determine how to allocate the pilot channel power 325, the paging channel power 330, and the synchronization channel power 335. For example, power is allocated to the overhead channels so that the sum of the powers allocated to the overhead channels 325, 330, 335 is equal to the difference between the total available power 320 and the power allocated to the traffic channel 315. In this manner, substantially all of the available power 320 may be used to support transmissions on the traffic channel and the overhead channels. The line 340 depicts the conventional fixed pilot power level. In this example, dynamically varying the overhead channel power allocations 325, 330, 335 allows the pilot channel power allocation 325 to increase over the conventional fixed pilot power level 340, which may result in increased coverage and/or performance.

In one embodiment, an IIR filter may be used to allocate overhead channel power. For example, if the average power over an interval T at the $i^{th}$ time instance is denoted as power [i] then a longer term average power can be calculated as:

Long_term_average_pwr[i]=power[i]×(1/k)+{1−(1/k)}× long_term_average_power[i−1]

This is an estimate of the average power over approximately kT time interval (where k>1). The scaling factor could be calculated using the longer term average power and, for example, the relation:

$$\text{scaling\_factor}[i] = 1 + (\text{scaling\_factor}[i-1] - 1) \times (1 - (1/K2)) + \left((1/K2) \times \left[\frac{\text{threshold} - \text{ltap}[i]}{\text{threshold}}\right]\right)$$

At the i-th instance, the channels could then be scaled by the corresponding scaling_factor[i]. Here, ltap[i] denotes the defined long_term_average_power[i]. Persons of ordinary skill in the art having benefit of the present disclosure should appreciate that this particular filtering technique is intended to be illustrative and not to limit the present invention. In alternative embodiments, other allocation techniques using other filters or alternative expressions for the average power and/or scaling factors may be implemented.

In the illustrated embodiment, the ratio of the overhead channel power allocations 325, 330, 335 are kept fixed at the initially determined ratios. However, persons of ordinary skill in the art having benefit of the present disclosure should appreciate that the present invention is not limited to fixed ratios of the overhead channel power allocations 325, 330, 335. In alternative embodiments, the overhead channel power allocations 325, 330, 335 (or various ratios thereof and/or other relations between the power allocations) may be determined independently. In other alternative embodiments, a power allocation buffer may be defined so that the dynamic overhead channel power allocation scheme 300 can only allocate an amount of power equal to the total available power 320 reduced by the power allocation buffer value. Furthermore, other embodiments may set maximum and/or minimum values on the overhead channel power allocations 325, 330, 335.

Figure 4:
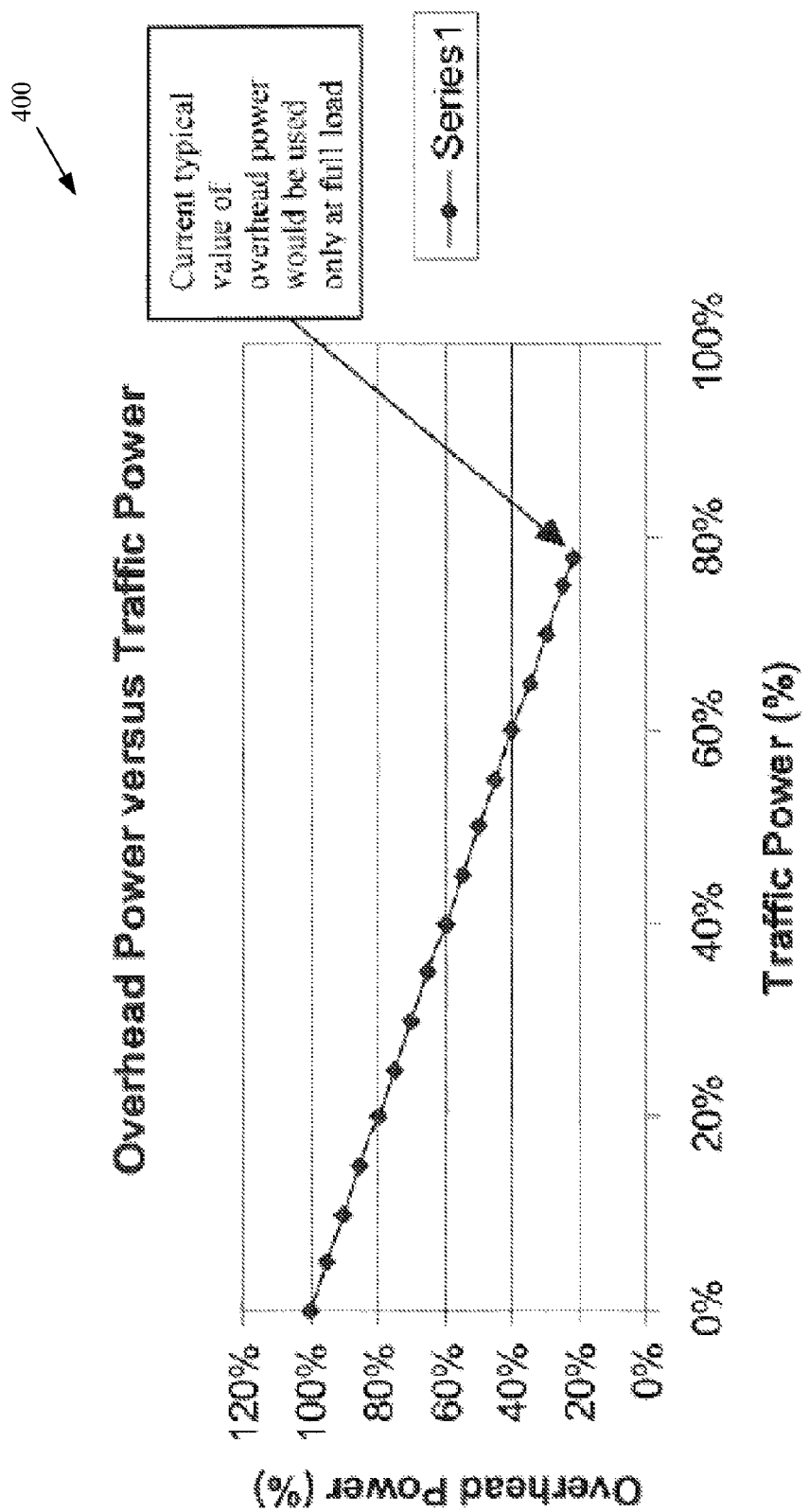
FIG. 4 conceptually illustrates a second exemplary embodiment of a dynamic overhead channel power allocation scheme, in accordance with the present invention.

FIG. 4 conceptually illustrates a second exemplary embodiment of a dynamic overhead channel power allocation scheme 400. In the second exemplary embodiment, the dynamic overhead channel power allocation scheme 400 enforces a minimum overhead channel power of approximately 22% of the total available power. Lower or higher full-load overhead channel power allocation percentages may alternatively be used. Using lower overhead channel power allocation percentages may result in reduced coverage relative to higher overhead channel power allocation percentages and using higher overhead channel power allocation percentages may result in increased coverage relative to lower overhead channel power allocation percentages. In the illustrated embodiment, the minimum overhead channel power of approximately 22% is only used when the corresponding cell is approximately fully loaded. Below full load, more overhead power is transmitted from the cell, which may improve system coverage and/or performance.

Figure 5:
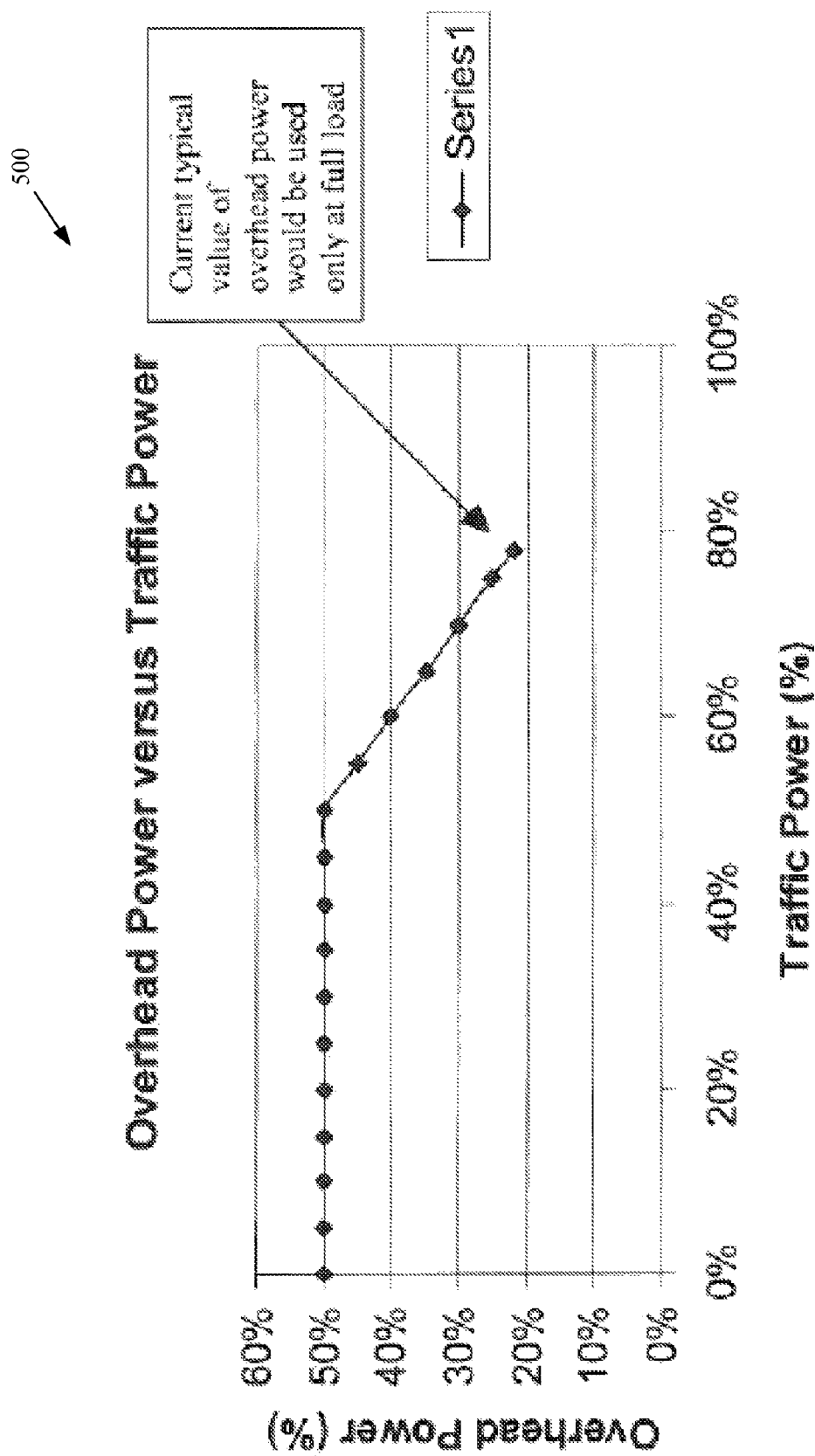
FIG. 5 conceptually illustrates a third exemplary embodiment of a dynamic overhead channel power allocation scheme, in accordance with the present invention.

FIG. 5 conceptually illustrates a third exemplary embodiment of a dynamic overhead channel power allocation scheme 500. In the third exemplary embodiment, the dynamic overhead channel power allocation scheme 500 caps the overhead channel power allocation at a predetermined maximum overhead channel power allocation percentage. In the illustrated embodiment, the maximum overhead channel power allocation is set to 50% of the total available power budget. The dynamic overhead channel power allocation scheme 500 also enforces a minimum overhead channel power of approximately 22% of the total available power, as in the embodiment shown in FIG. 4. The maximum overhead channel power allocation percentage may be selected to reduce interference levels present in the cells and/or to reserve a certain amount of power for the traffic channels. For example, a maximum overhead channel power allocation percentage may be set at a value beyond which only marginal improvements in system coverage and/or performance are expected because of the limitations caused by inter-cell interference.

Figure 6:
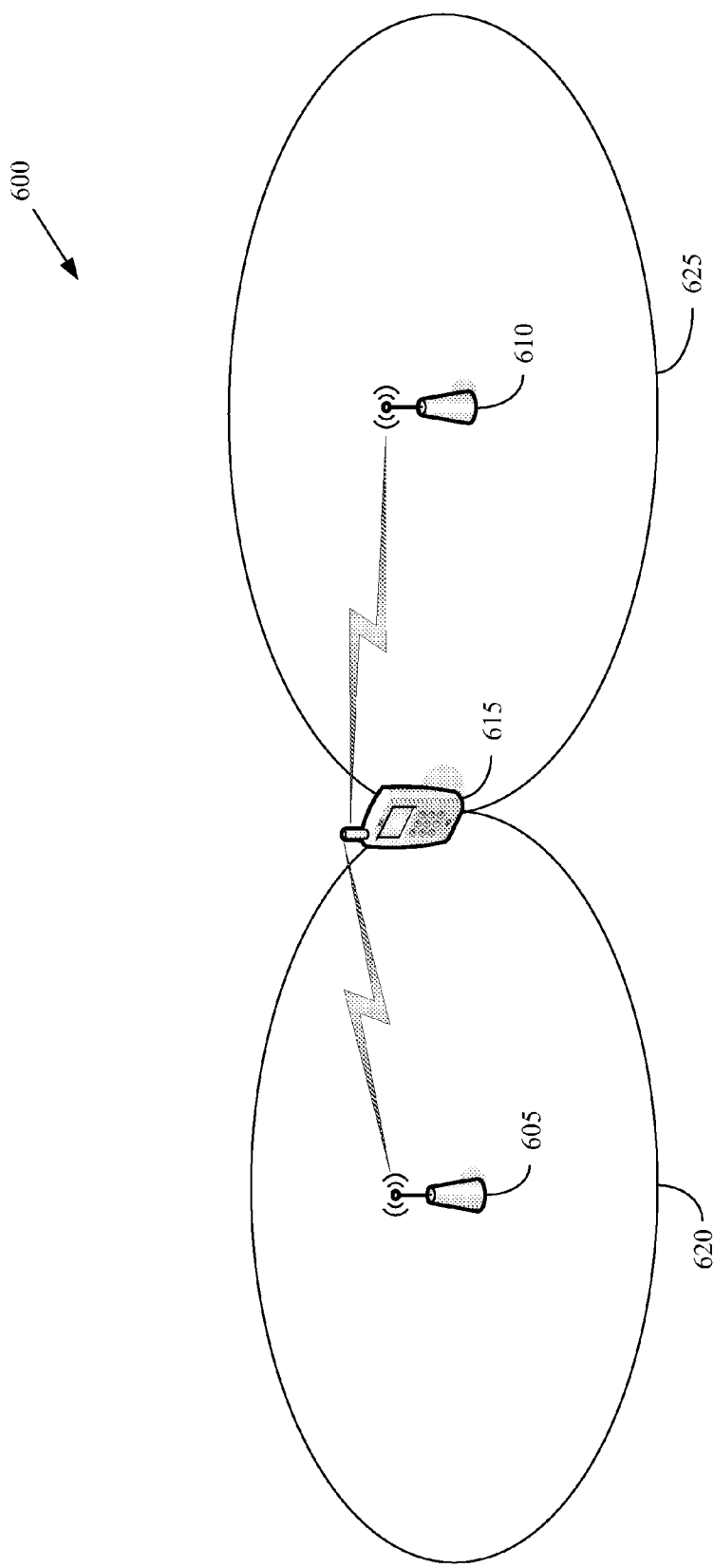
FIG. 6 conceptually illustrates a second exemplary embodiment of a wireless communication system, in accordance with the present invention.

FIG. 6 conceptually illustrates a second exemplary embodiment of a wireless communication system 600. In the illustrated embodiment, base stations 605, 610 provide wireless connectivity to mobile units 615 in corresponding cells 620, 625. The edges of the cells 620, 625 are defined as the point where the path loss to each base station 605, 610 is equal. For example, if the link budget path loss is Lp and each base station 605, 610 transmits a pilot channel power of Pp and a total power of Pt, then the location of the cell edges may be defined as:

Pilot A cell edge SINR=Pilot B cell edge SINR=(Pp/Lp)/(Pt/Lp+Nth), where Nth is the thermal noise power at the mobile unit 615 measured over the received channel and all transmissions from the same base station are assumed to be orthogonal. If one assumes, in the interest of clarity, that Pp/Lp is approximately equal to Nth and that the pilot power is ¼ of the total power, then the SINR at the cell edge is approximately given by:

Cell edge $SINR = 1/5 = -7$ dB.

Increasing the pilot power can improve the cell edge SINR. For example, doubling the pilot power leads to a new definition of the cell edge SINR and an improvement in the SINR:

Pilot $A$ cell edge $SINR$=Pilot $B$ cell edge $SINR = (2*Pp/Lp)/((Pp+Pt)/Lp+Nth)$, Cell edge $SINR = 1/3 = -4.8$ dB, and $SINR$ Improvement$= -4.8 - (-7) = 2.2$ dB Improvements closer to the base stations 605, 610 can be even greater, e.g., up to 3 dB in a completely noise-limited area. In some cases, improvements in interference-limited areas may be less, but the presence of such areas is not expected to dominate the results in most realistic deployment scenarios. For example, users at the edge of coverage (e.g., inside buildings, inside buses or trains, in homes and offices, and the like) may be limited by the thermal noise because signals from interfering cells are reduced by penetration losses. This may be the case even in situations where on-street and/or roof-mounted antenna measurements may appear to show that the system is interference-limited.

Increasing overhead channel power therefore results in improved SINR in the cells 620, 625, which may translate into improved coverage and/or performance. The SINR improvement of the proposed scheme results when unused power is available to increase the overhead channel power. Accordingly, the primary benefits in coverage and/or performance are expected when networks are running at less than full load. Most clusters of cells are only partially loaded, or at least only partially loaded on some sectors, which makes the application of dynamic overhead channel power allocation scheme described herein nearly ideal in most cases. Furthermore, even heavily loaded sectors are often surrounded by more lightly loaded sectors, and even the busiest sectors are only loaded during parts of the day, so that coverage and performance improvements can be expected in virtually every cell during at least some portion of the time.

Figure 7A:
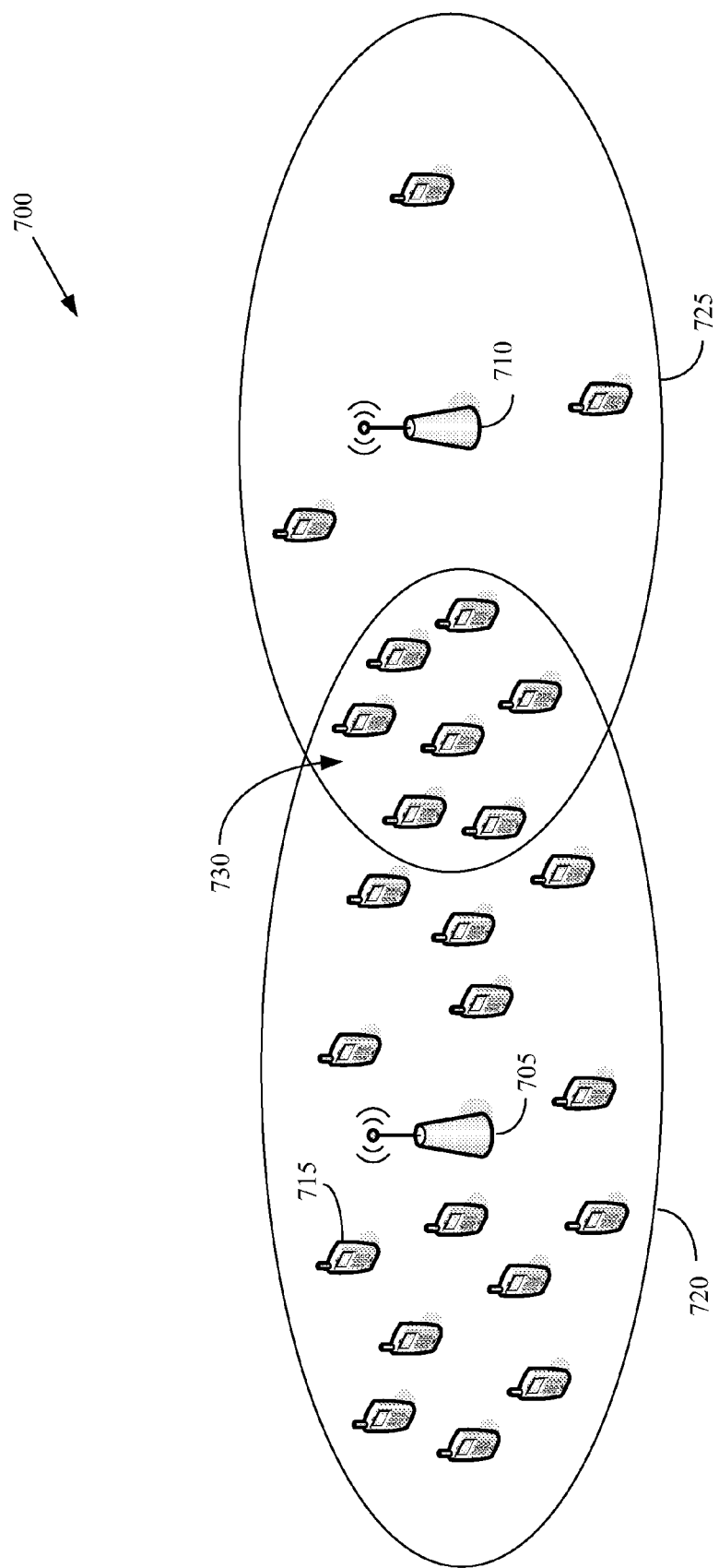
FIG. 7A conceptually illustrates a third exemplary embodiment of a wireless communication system, in accordance with the present invention.

FIG. 7A conceptually illustrates a third exemplary embodiment of a wireless communication system 700. In the illustrated embodiment, base stations 705, 710 provide wireless connectivity to mobile units 715 (only one indicated by a numeral in FIG. 7) in corresponding cells 720, 725. Each of the base stations 705, 710 is radiating approximately the same amount of pilot channel power and this amount is approximately constant in time. The sizes of the cells 720, 725 are therefore approximately equal and the cells 720, 725 overlap in a soft handoff zone 730. The distribution of mobile units 715 results in a much larger number of mobile units being in the cell 720 then are in the cells 725. However, soft handoff candidacy is determined by the value of Ec/Io for the pilot signal. Some implicit load shedding may occur because the larger number of mobile units in the cell 720 increases the overall traffic power and thus increases To, thereby reducing the value of Ec/Io from the base station 105. However, this effect may not be sufficient to balance the number of mobile units 715 served by each base station 705, 710. Consequently, many more mobile units 715 may attempt to access the wireless communication system 700 via the base station 705. If the base station 705 is power blocking, incoming mobile units 715 in the cell 720 may be turned away even though the base station 710 has power that could be allocated to other mobile units 715. Capacity relief may be required at cell 720, either through the addition of carriers or other means. Thus, when the mobile units 715 are distributed unevenly, the cell 720 is limiting the overall capacity of the wireless communication system 700.

Figure 7B:
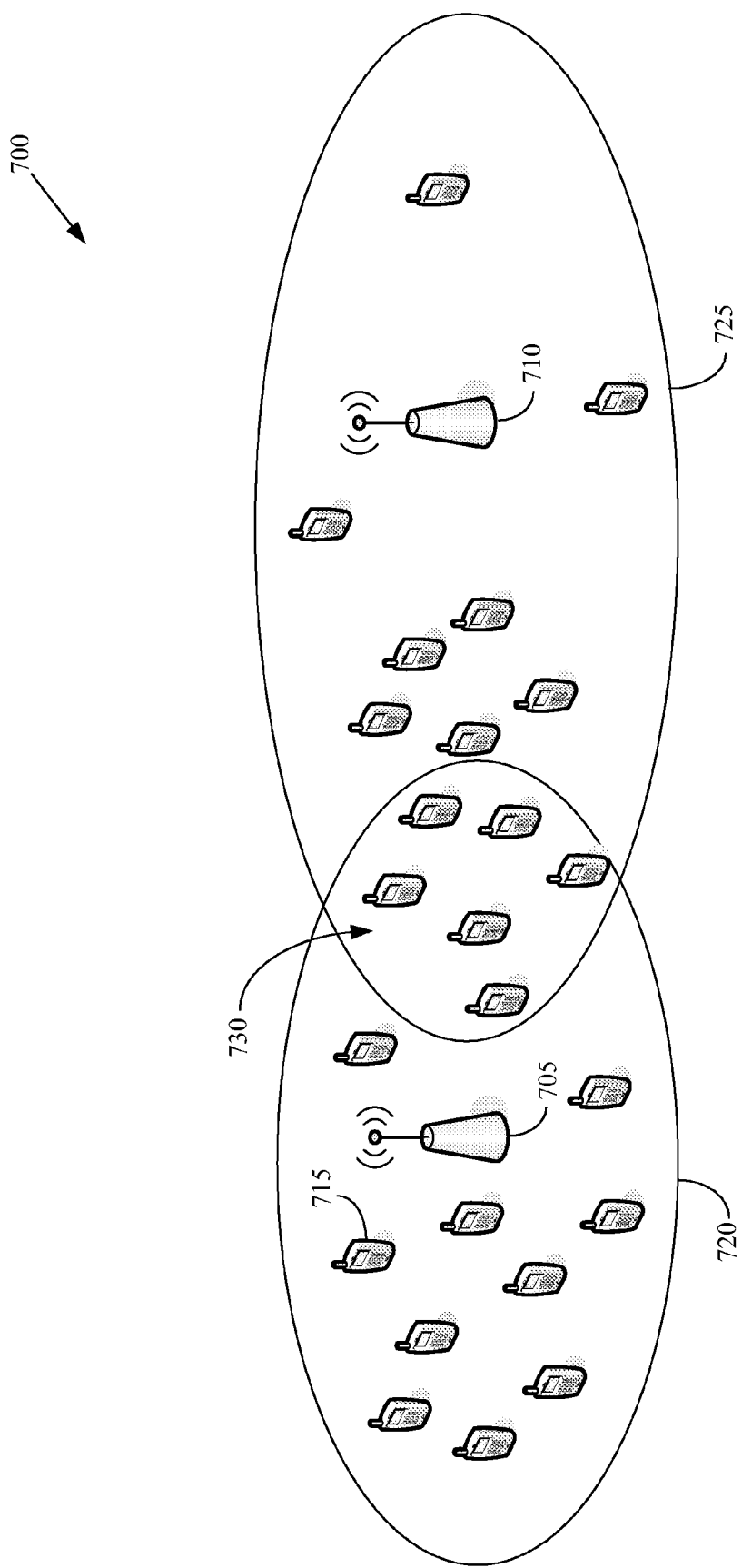
FIG. 7B conceptually illustrates the third exemplary embodiment of a wireless communication system with use of a dynamic overhead channel power allocation scheme, in accordance with the present invention.

FIG. 7B conceptually illustrates the third exemplary embodiment of the wireless communication system 700 when a dynamic overhead channel power allocation scheme is implemented. The distribution of the mobile units 715 shown in FIG. 7B is the same as the distribution of mobile units 715 shown in FIG. 7A. However, the sizes of the cells 720, 725 can be adjusted to accommodate the uneven distribution of mobile units 715 because the base stations 705, 710 implement dynamic overhead channel power allocation. For example, the base station 705 may decrease the overhead channel power allocation because of the relatively large traffic channel power allocation required to service the large number of mobile units 715. The size of the cell 720 may therefore also decrease. At the same time, the base station 710 may increase its overhead channel power allocation because of the relatively small traffic channel power allocation required to service the small number of mobile units 715 proximate the base station 710. The size of the cell 725 may therefore increase.

The variations in the overhead channel power allocations of the base stations 705, 710 may shift the soft handoff zone 730 towards the base station 705. The shift may be caused in part by the increase in the pilot channel power transmitted by the base station 710, which makes this pilot signal reach further into the cell 720, and in part by the increased interference in cell 720 caused by overhead channel transmissions by the base station 710. The shift in the soft handoff zone 730 decreases the number of mobile units 715 that must be served by the base station 705 and increases the number of mobile units 715 that can be served by the base station 710. Consequently, some of the soft handoff links that were being supported by the base station 705 may become simplex links on the base station 710 so that the base station 710 takes some of capacity load of the base station 705. Moreover, some of the links that were simplex links on the base station 705 may become soft handoff links to the base station 710 so that the base station 710 can support some of the capacity load of the base station 705 with soft handoff.

The dynamic overhead channel power allocation scheme can be therefore used as a load-balancing technique in the wireless authentication system 700. As illustrated in FIG. 7B, the shift in the soft handoff zone results in offloading some of the capacity of base station 705 on to base station 710. Effectively, this means that more capacity can be supported by base station 705 before blocking occurs, which may result in an increase in the limiting capacity of the wireless communication system 700. Shifting of capacity may also improve the overall performance of the wireless communication system 700. For example, when heavily loaded (but not blocking) sectors face lightly loaded sectors, some capacity can be transferred to the lightly loaded sectors. The net result may be that the overall network performance improves because performance generally degrades monotonically with loading.

The improved SINR gain that results from dynamic overhead channel power allocation may have a number of other advantages over the conventional fixed overhead channel power allocation scheme, in addition to the improved coverage area of the cells and dynamic load-balancing. For example, the improved SINR gain may result in improved drop-call statistics, origination and/or termination success rates, and/or no-page-response rates. The call quality perceived by the user, which may be quantified using the forward frame error rate, may be improved and the overall system capacity may be increased.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A method for implementation in a base station that supports at least one downlink traffic channel and at least one overhead channel, comprising:
    determining at least one power allocation for said at least one overhead channel based upon at least one measurement of downlink traffic channel power and a maximum transmission power of the base station, wherein determining said at least one power allocation for said at least one overhead channel comprises determining said at least one power allocation for said at least one overhead channel based upon a buffered value of the base station transmission power equal to the maximum transmission power of the base station minus a selected buffer transmission power; and
    transmitting signals over said at least one overhead channel using said at least one power allocation concurrently with transmission of signals over said at least one downlink traffic channel.

2. The method of claim 1, wherein determining said at least one power allocation for said at least one overhead channel comprises determining a difference between said at least one measurement of the downlink traffic channel power and the maximum transmission power of the base station and allocating power equal to the difference minus the selected buffer transmission power to said at least one overhead channel.

3. A method for implementation in a base station that supports at least one downlink traffic channel and at least one overhead channel, comprising:
    determining at least one power allocation for said at least one overhead channel based upon at least one measurement of downlink traffic channel power and a maximum transmission power of the base station, wherein determining said at least one power allocation for said at least one overhead channel comprises determining a difference between said at least one measurement of the downlink traffic channel power and the maximum transmission power of the base station and allocating power equal to the difference to said at least one overhead channel, and wherein determining said at least one power allocation for said at least one overhead channel comprises allocating a minimum overhead channel power to said at least one overhead channel when the difference is less than the minimum overhead channel power; and
    transmitting signals over said at least one overhead channel using said at least one power allocation concurrently with transmission of signals over said at least one downlink traffic channel.

4. The method of claim 3, comprising determining the minimum overhead channel power based upon a minimum coverage associated with the base station.

5. A method for implementation in a base station that supports at least one downlink traffic channel and at least one overhead channel, comprising:
    determining at least one power allocation for said at least one overhead channel based upon at least one measurement of downlink traffic channel power and a maximum transmission power of the base station, wherein determining said at least one power allocation for said at least one overhead channel comprises determining a difference between said at least one measurement of the downlink traffic channel power and the maximum transmission power of the base station and allocating power equal to the difference to said at least one overhead channel, and wherein determining said at least one power allocation for said at least one overhead channel comprises allocating a maximum overhead channel power to said at least one overhead channel when the difference is more than the maximum overhead channel power; and
    transmitting signals over said at least one overhead channel using said at least one power allocation concurrently with transmission of signals over said at least one downlink traffic channel.

6. The method of claim 5, comprising determining the maximum overhead channel power based upon at least one of an interference level associated with said at least one overhead channel and a minimum downlink traffic channel power.

7. The method of claim 1, wherein determining said at least one power allocation for said at least one overhead channel comprises varying power allocations for pilot channels, paging channels, and synchronization channels in response to the variations in said at least one measurement of the downlink traffic channel power.

8. The method of claim 7, wherein varying the power allocations for the pilot channels, paging channels, and synchronization channels comprises varying the power allocations such that fixed ratios of power are allocated to the pilot channels, paging channels, and synchronization channels.

9. The method of claim 7, wherein varying the power allocations for the pilot channels, paging channels, and synchronization channels comprises independently varying power allocated to the pilot channels, paging channels, and synchronization channels.

10. The method of claim 1, wherein transmitting signals over said at least one overhead channel using said at least one varied power allocation concurrently with transmission of signals over said at least one downlink traffic channel comprises transmitting signals over at least one overhead channel defined by at least one overhead channel code that is orthogonal to at least one traffic channel code used to define said at least one downlink traffic channel.

11. The method of claim 1, wherein transmitting signals over said at least one overhead channel using said at least one varied power allocation concurrently with transmission of signals over said at least one downlink traffic channel comprises transmitting signals over at least one overhead channel defined by at least one overhead channel tone or frequency that is orthogonal to at least one traffic channel tone or frequency used to define said at least one downlink traffic channel.

* * * * *